(12) United States Patent
Ros

(10) Patent No.: US 6,217,754 B1
(45) Date of Patent: Apr. 17, 2001

(54) SWIMMING POOL FILTER

(75) Inventor: Armand Puiggros Ros, Sant Jaume de Llierca (ES)

(73) Assignee: Aplister, S.A. (ES)

( * ) Notice: Subject to any disclaimer, the term of this patent is extended or adjusted under 35 U.S.C. 154(b) by 0 days.

(21) Appl. No.: 09/369,823

(22) Filed: Aug. 6, 1999

(30) Foreign Application Priority Data

Oct. 8, 1998 (ES) .................................... 9802531 U
Oct. 9, 1998 (ES) .................................... 9802540 U

(51) Int. Cl.[7] .................................... B01D 17/12
(52) U.S. Cl. .................. 210/90; 210/169; 210/232; 210/314; 210/335; 210/443; 210/198.1
(58) Field of Search .................. 210/90, 169, 198.1, 210/206, 209, 335, 339, 440, 442, 232, 314, 443, 541; 422/264

(56) References Cited

U.S. PATENT DOCUMENTS

| | | | | |
|---|---|---|---|---|
| 3,899,425 | * | 8/1975 | Lewis | 210/169 |
| 4,210,624 | * | 7/1980 | Price | 422/264 |
| 4,780,197 | * | 10/1988 | Schuman | 210/206 |
| 5,908,553 | * | 6/1999 | Reid | 210/209 |
| 6,004,458 | * | 12/1999 | Davidson | 210/206 |

* cited by examiner

Primary Examiner—Joseph W. Drodge
(74) Attorney, Agent, or Firm—Steinberg & Raskin, P.C.

(57) ABSTRACT

A swimming pool filter including a casing having an opening and a filter cartridge arranged in the casing having an axial hollow core. The swimming pool filter also includes a top cover having means for securing the top cover to the casing in order to cover the opening of the casing and an opening substantially corresponding to the axial hollow core of the filter cartridge. The swimming pool filter further includes a plug structured and arranged to fit within the opening of the top cover and an accessory element arranged in the plug to complement the functions of the filter. The accessory element is structured and arranged to fit at least partially within the axial hollow core of the filter cartridge when the plug is fitted within the opening of the top cover.

10 Claims, 7 Drawing Sheets

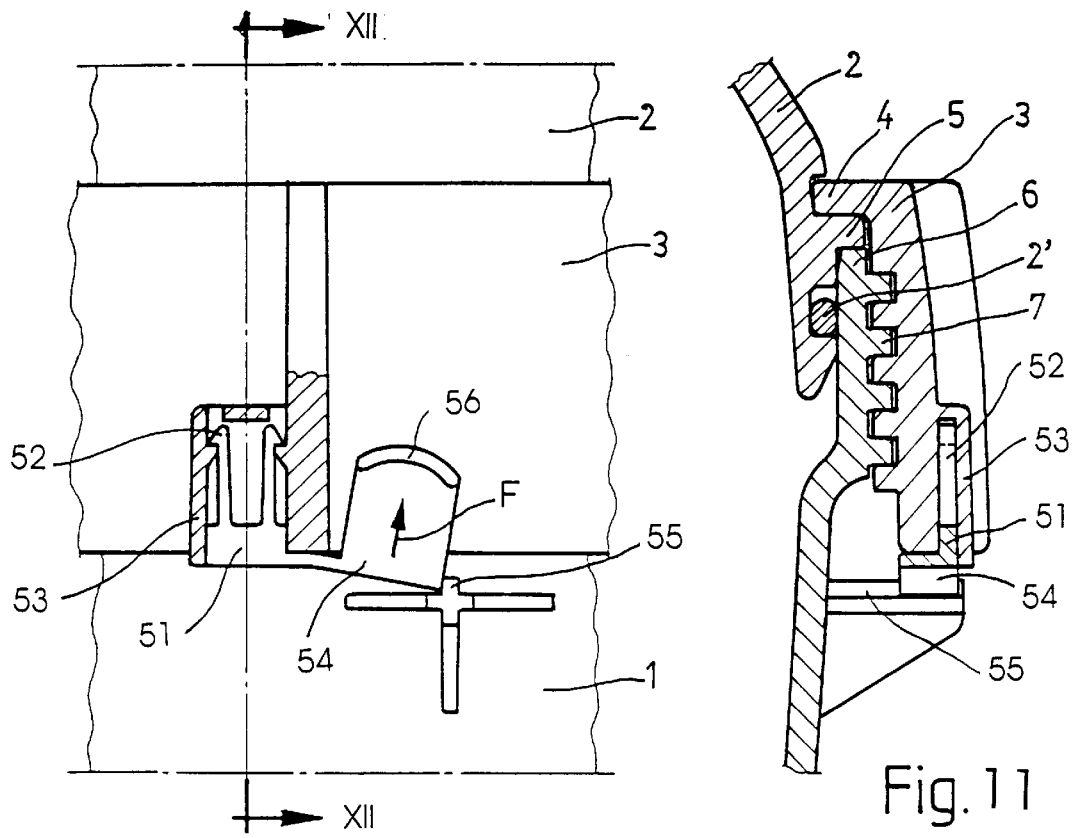
Fig. 10
Fig. 11
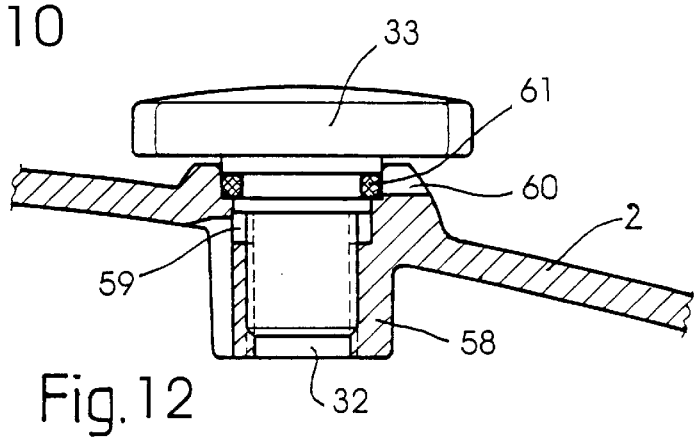
Fig. 12
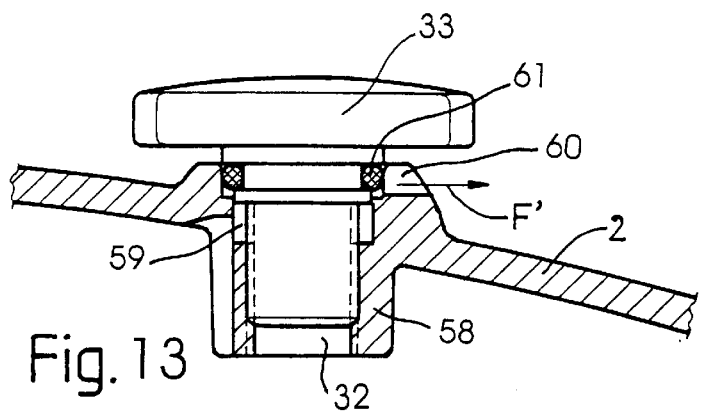
Fig. 13

SWIMMING POOL FILTER

FIELD OF THE INVENTION

The present invention relates to a swimming pool filter.

BACKGROUND OF THE INVENTION

For the cleaning of swimming pool water, several types of filters are already known which consist of casings having water inlet and outlet connections. The casings also include top covers and footing or bearing feet and receive sand fillings or a filtering cartridges.

The filter of the present invention provides a sensible improvement over prior art filters equipped with a filtering cartridge of a generally cylindrical shape forming an axial hollow core and being arranged in an upright position within the casing forming the filter body. The instant filter also provides an improvement over those filters comprising a cover provided to be secured by means of a ring nut apt to be fitted to the opening of the casing, the cover comprising fitting means for the fitting of a manometer and an outlet with plug for bleeding and/or draining purposes.

OBJECTS AND SUMMARY OF THE INVENTION

Accordingly, it is one aspect of the present invention to arrange an accessory element in the axial hollow core of the filter cartridge. The accessory element complements the functions of the filter.

For example, the accessory element can be a heat exchanger for heating the water, a salt or chlorine cartridge for treating the water, or other accessories for various functions. Moreover, the accessory element can be an element for treating the water by means of ultraviolet rays.

In order to bring about this improvement, the instant filter is characterized in that it has an opening in a central location in its cover matching the hollow core of the filtering cartridge. The opening is closed with a plug which seals the opening and which is removably fitted to it. The opening forms an internal neck and the plug is fitted within the neck in a bayonet attachment, the fitting being carried out in a secure way. The neck includes anchoring elements and the plug includes lugs on its periphery, each anchoring element being for one of the respective lugs. The anchoring elements have particular shape comprising an incline along whose lower surface the corresponding lug slides into the anchoring element, and another incline along whose upper surface the lug slides out of the anchoring element. A lower recess is arranged between both inclines where the lug is held to thus secure the plug in its closing position, this being aided by the very internal pressure of the filter.

The instant improvements relate as well to the construction of the cartridge, the ring nut locking device, the fitting of the manometer and the construction of the bleeding outlet.

As for the construction of the cartridge, it is characterized in that it is formed by superimposed joinable modules thus allowing to obtain cartridges of different heights, the modules forming the cartridge's tubular core to which radial gills for filtration by means of diatomites can be attached by means of clips.

Regarding the ring nut locking device, its construction and arrangement is such that it can be operated with the same hand driving the ring nut when unscrewing it.

The manometer is fitted in a protected arrangement, for such a purpose being housed in a pocket provided in the cover; and the bleeding outlet has a construction that is such that it allows the bleeding and/or draining to take place without totally removing the plug plugging the outlet.

These and other characteristics will be best made apparent by the following detailed description whose understanding will be made easier by the accompanying seven sheets of drawings showing a practical embodiment cited only by way of an example which does not limit the scope of the present invention.

BRIEF DESCRIPTION OF THE DRAWINGS

Additional objects of the invention will be apparent from the following description of the preferred embodiment thereof taken in conjunction with the accompanying non-limiting drawings, in which:

FIG. 10 is a partially sectioned front elevational view of the construction of the locking device and its arrangement in the ring nut;

FIG. 11 is a vertical sectional view taken along line XI—XI of FIG. 10;

FIG. 12 is an elevational sectional view of a closed bleeding outlet; and

FIG. 13 is an elevational sectional view of an open bleeding outlet.

DETAILED DESCRIPTION OF THE PREFERRED EMBODIMENT

Figure 1:
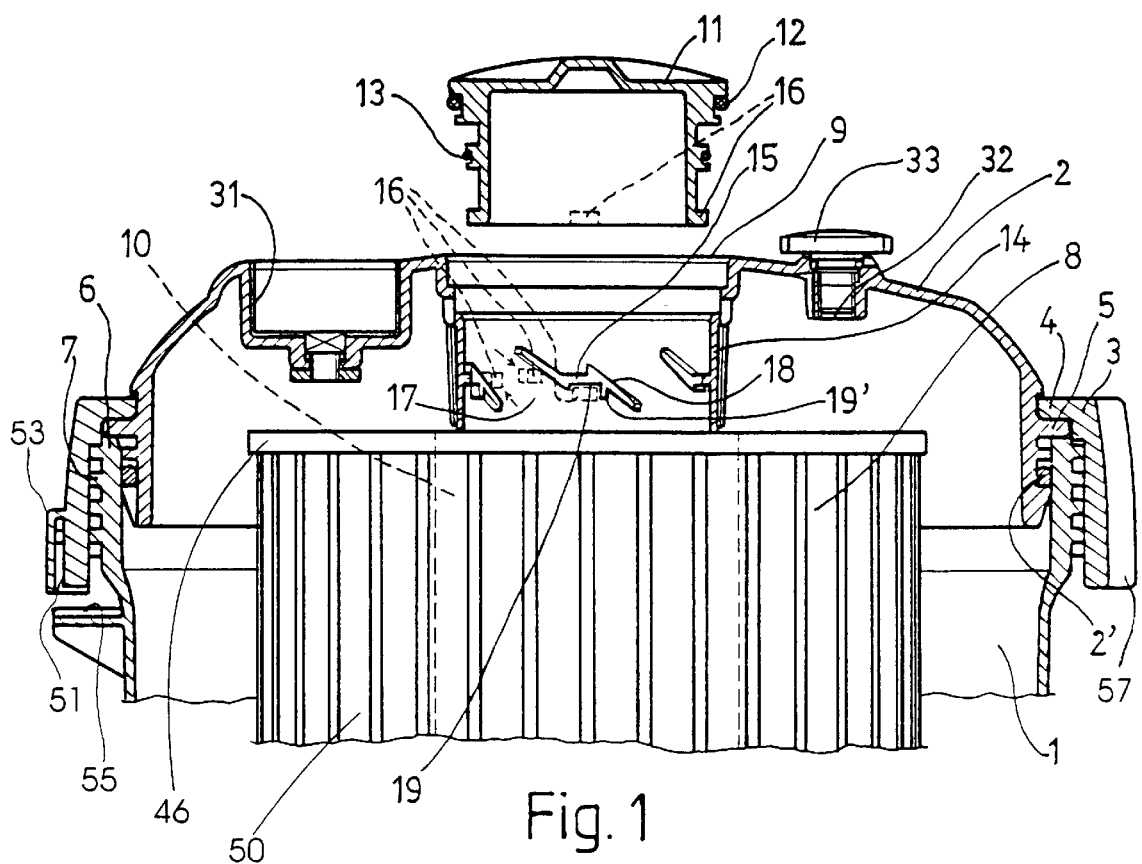
FIG. 1 is an elevational sectional view of the top of a filter with its opening and cover fitted together and with the plug in a detached arrangement.
Figure 2:
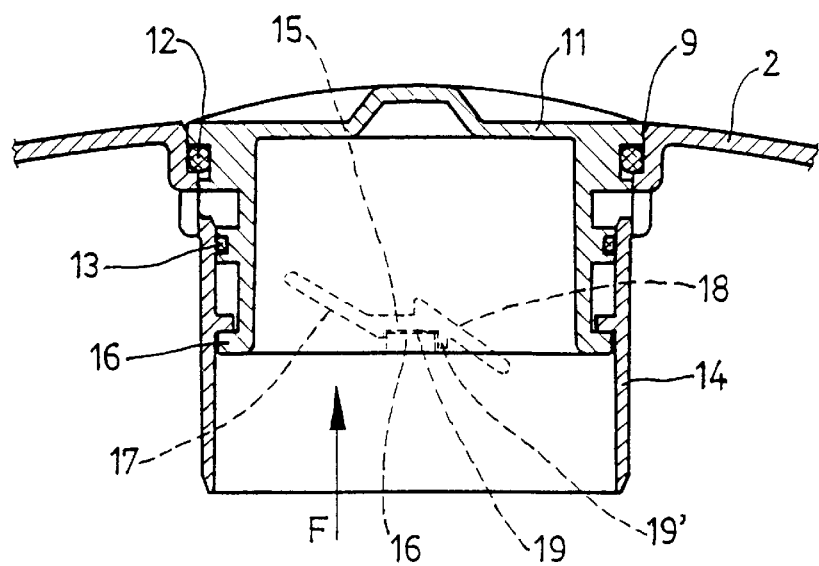
FIG. 2 is an elevational detailed view in section of the plug having already been fitted into the cover's opening.

According to the drawings, the filter comprises a casing 1 with a top cover 2 provided to be secured by means of a ring nut 3 which by means of an inner flange 4 provided at its top edge presses a peripheral flange 5 of the cover against the top opening 6 of the casing to which the ring nut is fitted. The opening has for such a purpose an external thread 7, the filtering cartridge 8 being installed inside the casing and in this case being intended for filtration by means of diatomites. Cover 2 has on its periphery a groove housing an O-ring seal as a sealing element.

Characteristically, cover 2 has at its center an opening 9 matching the hollow core 10 of the filtering cartridge, the opening being provided to be closed with plug 11 sealing the opening by means of two O-ring seals. On O-ring 12 has a bigger cross-section and the other one 13 has a smaller cross-section, the plug being removably fitted in a bayonet attachment.

Opening 9 forms in the cover an internal neck 14 wherein plug 11 is fitted in a bayonet attachment. The neck has anchoring elements 15 each for one of the lugs 16 provided on the periphery of the plug, the anchoring elements having an incline 17 along whose lower surface the corresponding lug 16 slides into the anchoring element, and another incline 18 along whose upper surface the lug slides out of the anchoring element, there being between both inclines a lower recess 19 where the lug is held to thus secure the plug in its closing position. This recess has at its rear end a lower projection 19' acting as a stop in order to prevent lug 16 from being further shifted when having reached it.

When fitting plug 11, in order to allow lug 16 to be shifted into recess 19 of anchoring element 15, the plug will be pressed down thus compressing O-ring seal 12 which will then resiliently recover its original shape once the lug has fitted into the recess. Once the plug is fitted, the internal pressure of the filter as per arrow F will aid to secure the fitting.

In order to withdraw plug 11, the pump shall be switched off so as to then have no pressure inside the casing 1, and after having bled the internal air, the plug 11 shall be pressed down thus compressing O-ring seal 12.

In an alternate embodiment, plug 11 can be replaced with a similar plug 11A (not shown) to be as well fitted into neck 14 of opening 9, this other plug 11A having a construction apt to receive an accessory element provided to be fitted into it and to complement the functions of the filter, the accessory element being thus housed in the hollow core 10 of filtering cartridge 8.

Figure 3:
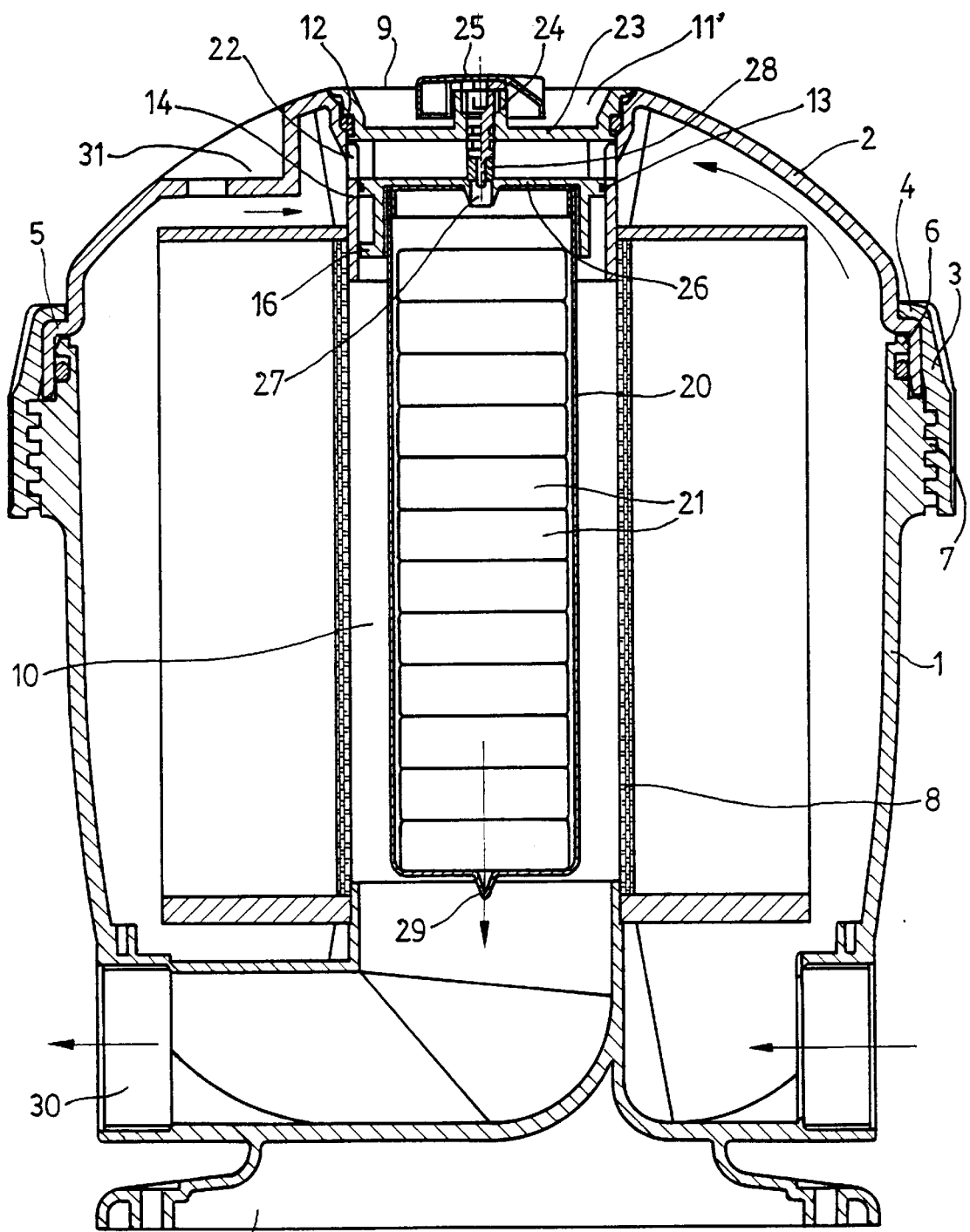
FIG. 3 is an elevational sectional view of a filter having a chlorine cartridge for treating the water fitted in the plug.

FIG. 3 shows a filter in whose core 10 of the filtering cartridge an accessory element is housed by means of which chlorine will be dosed into the water being filtered. This accessory element is a cylindrical container 20 formed of a plastic material provided to house discoidal chlorine tablets 21 inside it. Plug 11' has a special construction forming a lateral passage in communication with openings 22 of internal neck 14 between an upper flat 23 with upper neck 24 provided to receive a plug 25 in a fitted in or screwed in attachment, and a lower flat 26 with tapered lower neck 27 by means of which container 20 is axially pierced. Threaded plug 25 ends in a resilient bush 28 with which the passage of water to the chlorine tablets is to be regulated, container 20 having on its bottom base one or more tapered projections 29 which once cut will allow the controlled passage of the already chlorinated water towards outlet 30 of the filter.

Other accessory elements can be, for example, a heat exchanger to heat up the water, a salt cartridge for salt treating the water, or an element provided to treat the water by means of ultraviolet rays.

If filtering cartridge 8 is provided to carry out a filtration by means of diatomites, as shown in the drawings, adequate filters shall be conveniently arranged in openings 22 of internal neck 14.

Figure 4:
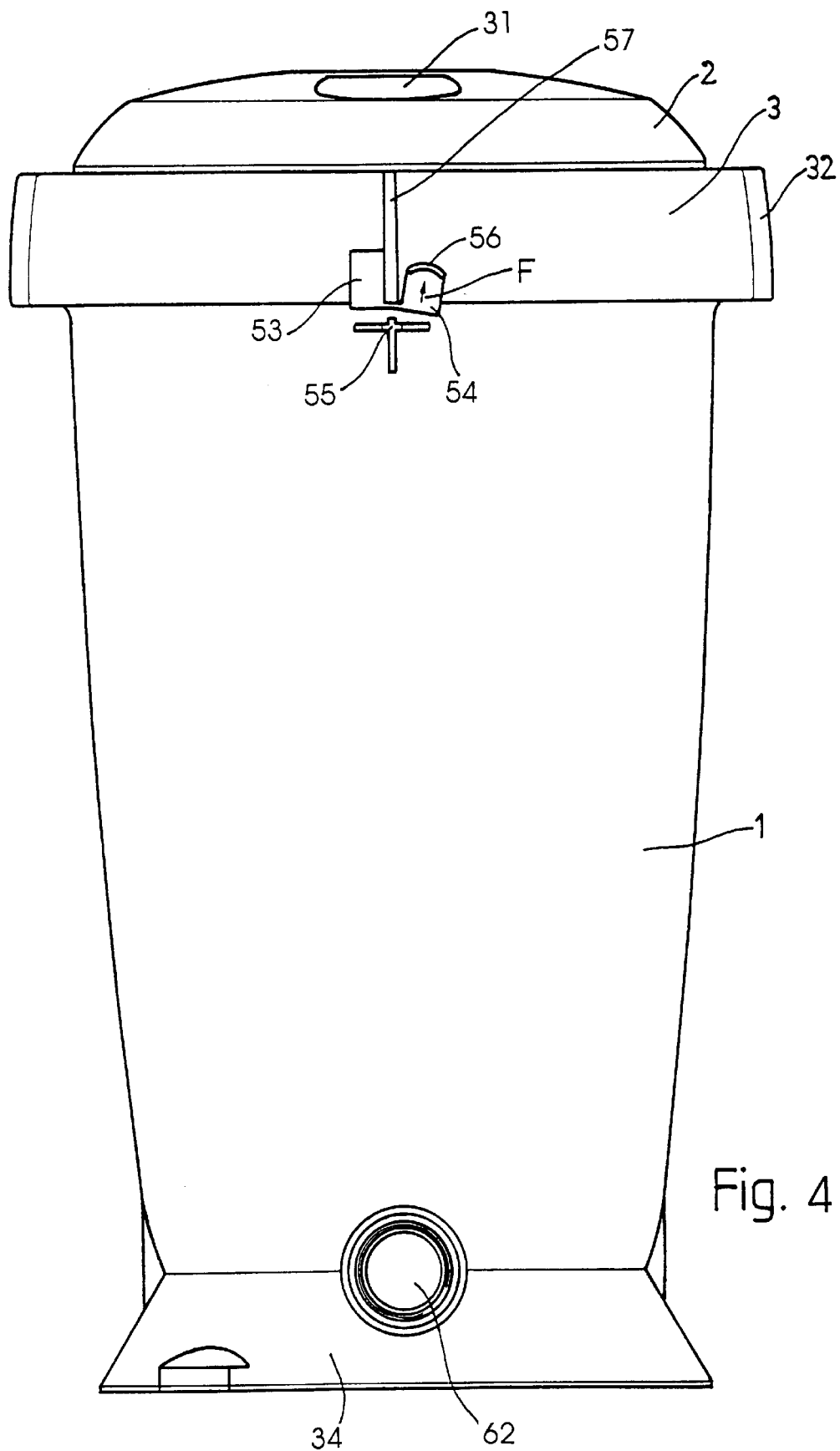
FIG. 4 is an elevational view of the filter of the invention.

As shown in FIG. 4, the filter cover 2 is completed with a pocket 31 for a manometer (not shown) and with an outlet 32 with plug 33 for bleeding and/or draining purposes. Casing 1 includes an adequate footing 34 at the bottom.

Figure 5:
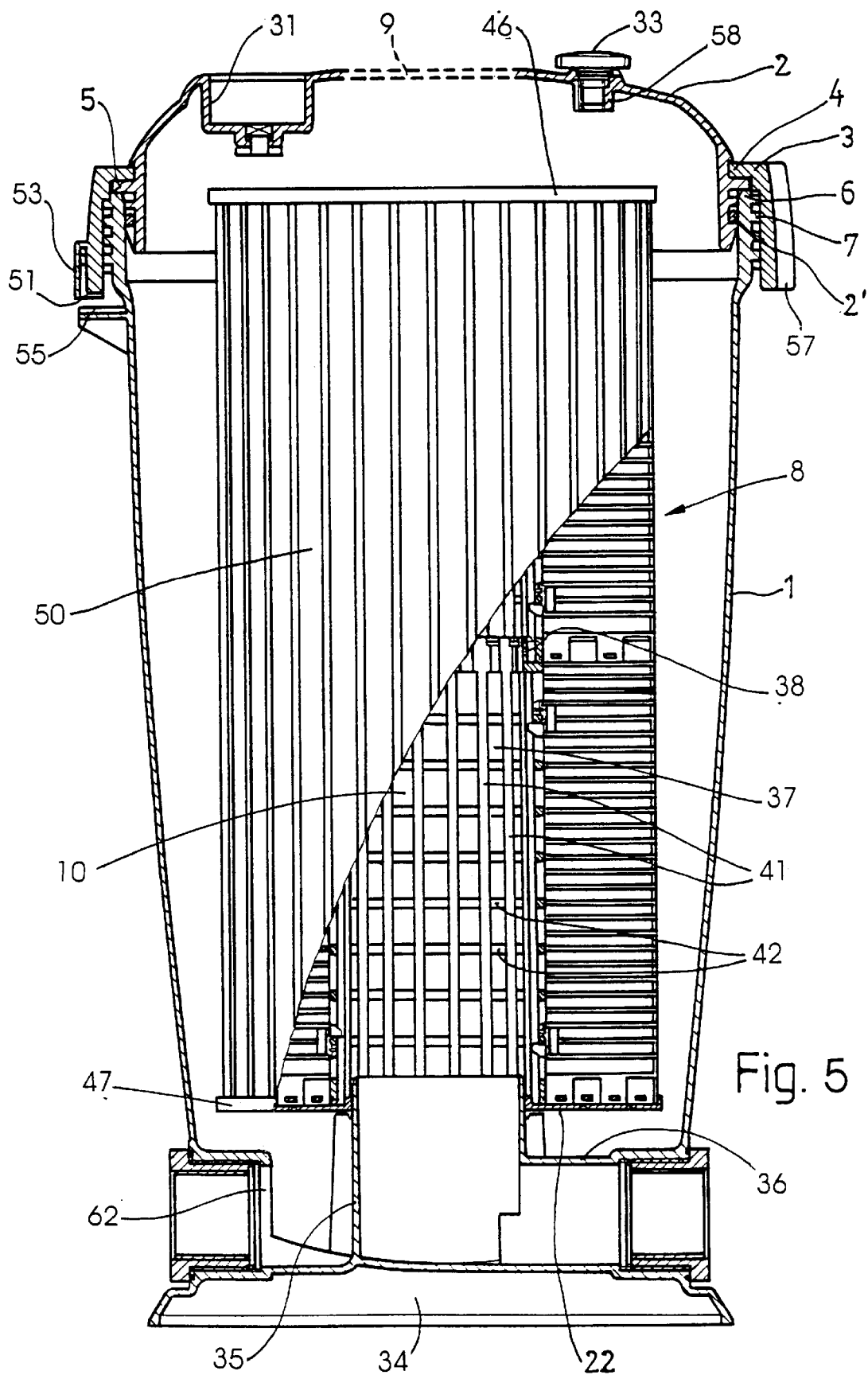
FIG. 5 is an elevational sectional view of the filter as shown in FIG. 4.
Figure 6:
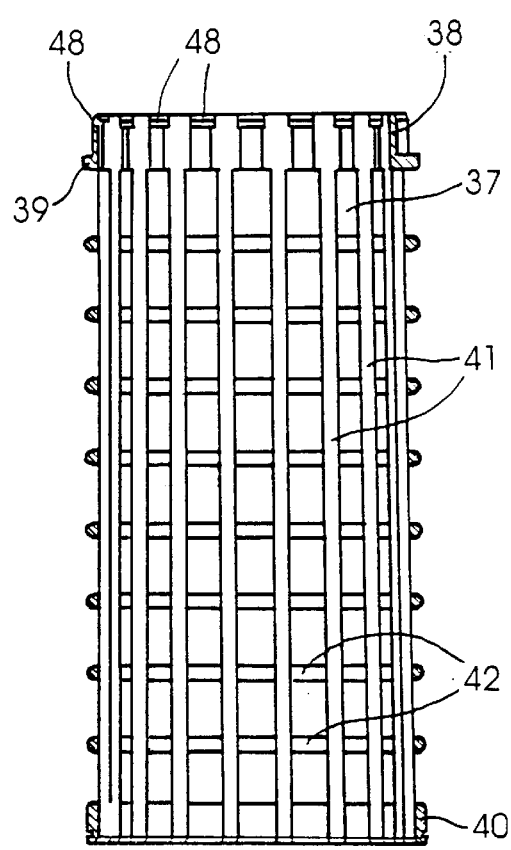
FIG. 6 is an elevational sectional view of a module forming the tubular core of the cartridge.
Figure 7:
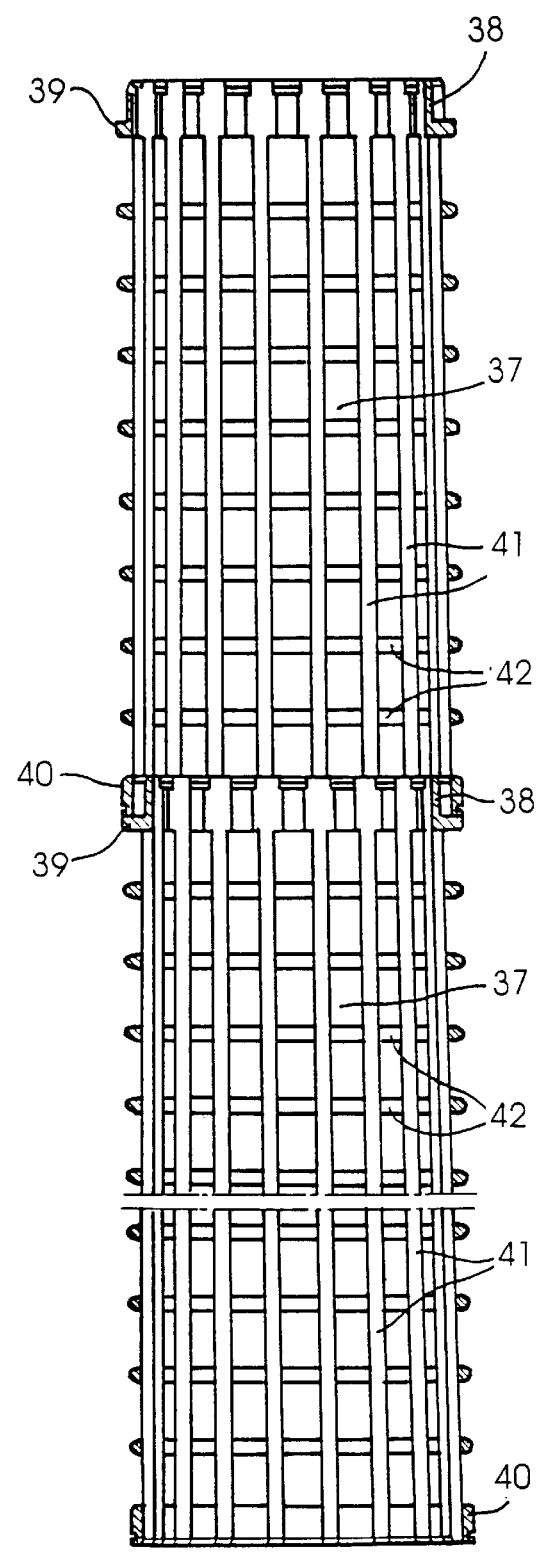
FIG. 7 is an elevational sectional view of multiple modules as shown in FIG. 6 joined together.

As shown in FIG. 5, casing 1 forms on its footing 34 a coaxial bush 35 in communication with radial outlet 36 for the already cleaned up water. As shown in FIGS. 5 and 6, a filtering cartridge 8 is fitted onto this bush comprising a tubular gridded core formed by two coaxially superimposed and joined filter cartridge modules 37. In order to be joined together, the modules include a ring 38 at the top having a flange 39. At the bottom, each module includes a ring 40 provided to rest on the flange. The grid of the modules 37 is formed by longitudinal rods 41 and transversal rods 42. The mutual attachment of modules 37 will be secured by means of an adequate glue or adhesive.

Figure 8:
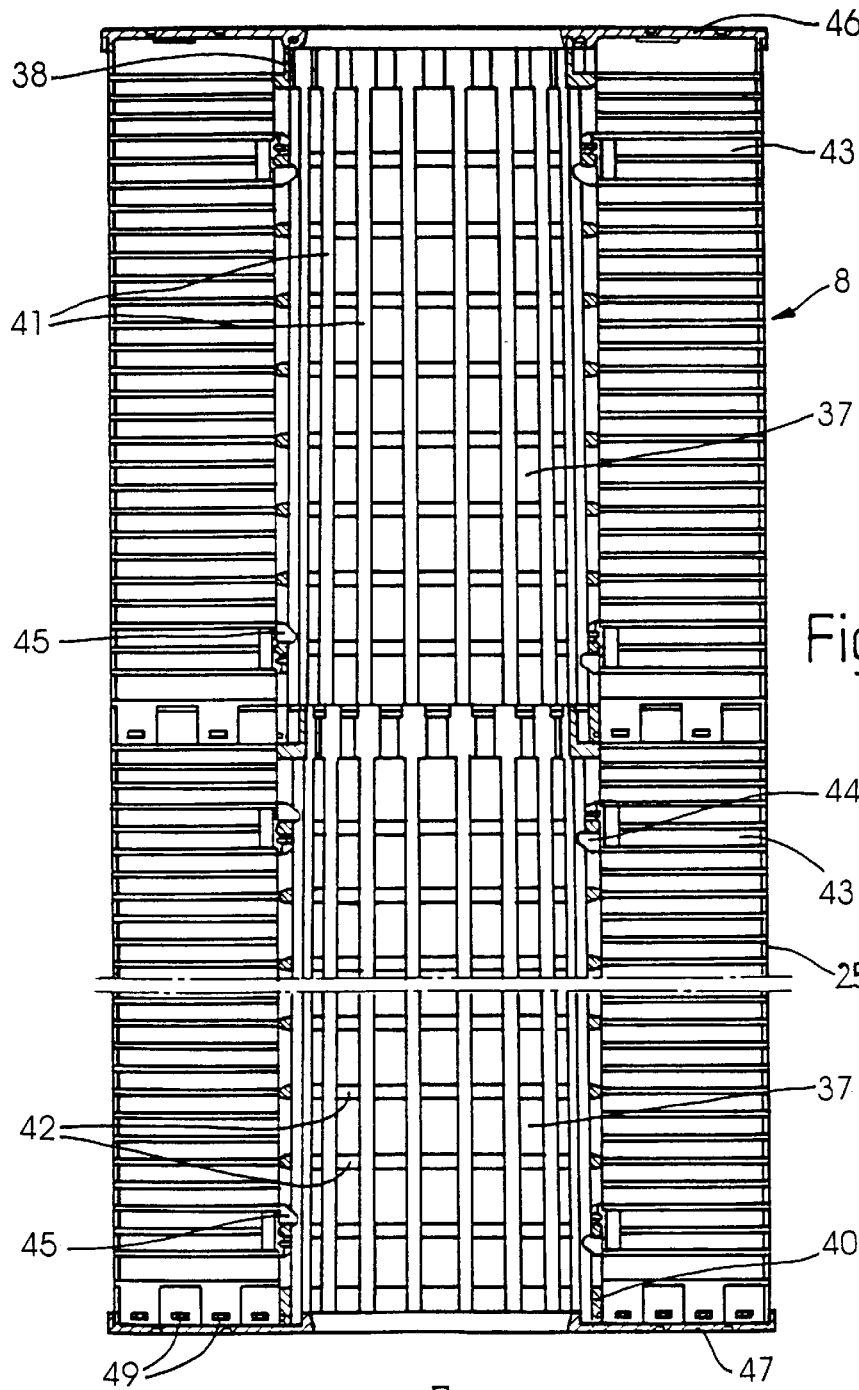
FIG. 8 is an elevational sectional view of a cartridge's tubular core provided with radial gills for the filtration by means of diatomites.
Figure 9:
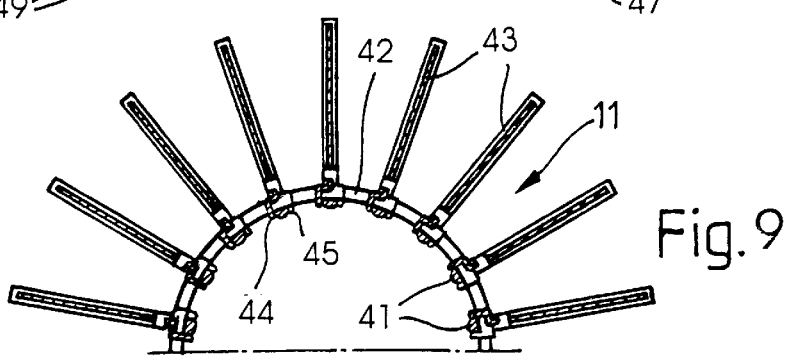
FIG. 9 is a cross-sectional view of half of the cartridge's tubular core as shown in FIG. 8.

As shown in FIGS. 8 and 9, in the case where the filtering is carried out by means of diatomites, the cartridge will have gills 43 radially attached to its tubular core by means of clips provided on the gills forming a pair of hooks 44 and 45. Hook 44 creates an upper hook engagement and hook 45 creates a lower hook engagement. The hooks are arranged at different heights and engaging the corresponding longitudinal rod 41 of the modules and their corresponding transversal rod 42.

The cartridge is completed with a top and bottom cap 46 and 47, respectively. The caps are molded on the ends of the cartridge thus being anchored in holes 48 and 49 for such a purpose provided in the ends. The caps are fitted after the corresponding pervious sheet 50 is installed on the periphery of the cartridge.

As shown in FIG. 10, ring nut 3 comprises a locking device securing cap 2 in its closed position. The locking device is formed by an element 51 fitted with anchoring means 52 into a pocket 53 of the lower edge of the ring nut. The element has a resilient appendage 54 obliquely projecting at the bottom and meeting a stop 55 radially protruding from the wall of casing 1. The appendage upperly forms a grip 56 facilitating the lifting of the appendage as shown at arrow F and hence the releasing of the appendage from the stop, thus allowing ring nut 3 to be unscrewed which, in order to facilitate the operation, has vertical ribs 57.

Cover 2 has in its upper surface a pocket 31 provided to receive the manometer (not shown) in a flush fit (FIG. 1). As shown in FIGS. 12 and 13, cover 2 is upperly provided as well with an opening 32 forming a threaded inner bush 58 having a radial orifice 59 at its start in order to facilitate the total bleeding which, as well as the draining, takes place as per arrow F' through an upperly provided radial slot 60 without having to fully withdraw the threaded plug 33. The plug 33 is provided with an O-ring seal 61 carrying out the sealing of this opening.

Reference numeral 62 (FIG. 4) denotes the inlet at the filter footing for the water from the swimming pool.

The invention can within its essentially be put into practice in other embodiments differing only in detail from the one described above only by way of example, the other embodiments also falling within the scope of the protection claimed.

What is claimed is:

1. A swimming pool filter, comprising a casing having an opening;

a filter cartridge arranged in said casing, said filter cartridge having an axial hollow core;

a top cover having means for securing said top cover to said casing in order to cover the opening of said casing and an opening substantially corresponding to the axial hollow core of said filter cartridge;

a plug structured and arranged to fit within the opening of said top cover; wherein said plug is substantially cylindrical and comprises at least one lug on the periphery of said plug; and an accessory element arranged in said plug to complement the functions of the filter, said accessory element being structured and arranged to fit at least partially within the axial hollow core of the filter cartridge when said plug is fitted within the opening of said top cover;

said top cover having an internal neck for receiving said plug in a bayonet attachment, said internal neck including at least one anchoring element structured and arranged to engage with each of said at least one lug, said at least one anchoring element comprising a first incline having a surface along which said at least one lug is slidable, a second incline having a surface along which said at least one lug is slidable, and a lower recess coupling said first incline to said second incline structured and arranged to hold said at least one lug thereby securing said plug within said top cover.

2. The swimming pool filter as in claim 1, wherein said means for securing said top cover to said casing comprises a ring nut having a lower edge.

3. The swimming pool filter as in claim 2, wherein said ring nut comprises means for locking said cover in a closed position.

4. The swimming pool filter as in claim 3, wherein said locking means comprises an element fitted to the lower edge of said ring nut, said element having a resilient appendage obliquely projecting at the bottom and meeting a stop radially protruding from the wall of said casing.

5. The swimming pool filter as in claim 1, wherein said cover comprises a pocket structured and arranged to receive a manometer.

6. The swimming pool filter as in claim 1, wherein said cover comprises a threaded inner bush having a radial orifice at the start of said thread; and a radial slot for carrying out a bleeding and/or draining operation without having to fully withdraw said plug from said cover.

7. A swimming pool filter, comprising:

a casing having an opening;

a filter cartridge arranged in said casing, said filter cartridge having an axial hollow core including:

one or more coaxially joinable modules forming a tubular gridded core;

radial gills; and means for attaching said radial gills to said modules;

a top cover having means for securing said top cover to said casing in order to cover the opening of said casing and an opening substantially corresponding to the axial hollow core of said filter cartridge;

a plug structured and arranged to fit within the opening of said top cover; and an accessory element arranged in said plug to complement the functions of the filter, said accessory element being structured and arranged to fit at least partially within the axial hollow core of the filter cartridge when said plug is fitted within the opening of said top cover.

8. The swimming pool filter as in claim 7, wherein said means for attaching said radial gills to said modules comprises clips.

9. The swimming pool filter as in claim 8, wherein the clips are formed on said gills by a pair of hooks, said pair of hooks comprising an upper hook and a lower hook, said upper hook and said lower hook being arranged at different heights and engaging said longitudinal rods of the modules and said transversal rods of the modules, respectively.

10. The swimming pool filter as in claim 7, wherein each of said modules is substantially cylindrical and has a top and a bottom, each module being structured and arranged to be arranged on top of one another and comprising a plurality of longitudinal and transversal rods arranged on the face of each module;

a ring having a flange arranged on the top of each module; and a ring arranged on the bottom of each module structured and arranged to cooperate with said flange of another module.

* * * * *

UNITED STATES PATENT AND TRADEMARK OFFICE
CERTIFICATE OF CORRECTION

PATENT NO. : 6,217,754 B1  
DATED : April 17, 2001  
INVENTOR(S) : Roig

Page 1 of 1

It is certified that error appears in the above-identified patent and that said Letters Patent is hereby corrected as shown below:

<u>Title page,</u>  
Item [75], Inventor, should read -- Roig --

Signed and Sealed this

Sixteenth Day of April, 2002

Attest:

Attesting Officer

JAMES E. ROGAN  
*Director of the United States Patent and Trademark Office*